United States Patent
Nallen et al.

(10) Patent No.: US 8,501,083 B2
(45) Date of Patent: Aug. 6, 2013

(54) SPRAY QUENCH SYSTEMS FOR HEAT TREATED METAL PRODUCTS

(75) Inventors: Michael A Nallen, Old Saybrook, CT (US); Paul F. Scott, Farmington, CT (US)

(73) Assignee: Thermatool Corporation, East Haven, CT (US)

( * ) Notice: Subject to any disclaimer, the term of this patent is extended or adjusted under 35 U.S.C. 154(b) by 0 days.

(21) Appl. No.: 11/672,544

(22) Filed: Feb. 8, 2007

(65) Prior Publication Data

US 2007/0181234 A1   Aug. 9, 2007

Related U.S. Application Data

(60) Provisional application No. 60/771,386, filed on Feb. 8, 2006.

(51) Int. Cl.
*C21D 1/00* (2006.01)
*C21D 9/00* (2006.01)
*C21D 6/00* (2006.01)

(52) U.S. Cl.
USPC .......................................... 266/114; 148/660

(58) Field of Classification Search
None
See application file for complete search history.

(56) References Cited

U.S. PATENT DOCUMENTS

| | | | |
|---|---|---|---|
| 1,672,061 A | 6/1928 | George | |
| 2,657,698 A * | 11/1953 | Garrett | 134/182 |
| 2,785,924 A | 3/1957 | Kane | |
| 3,255,053 A * | 6/1966 | Bard et al. | 148/645 |
| 3,675,908 A * | 7/1972 | Amend | 134/64 R |
| 3,861,597 A | 1/1975 | Tsukamura et al. | |
| 4,488,710 A | 12/1984 | Greenberger | |
| 5,213,636 A | 5/1993 | Akers et al. | |
| 6,656,413 B2 * | 12/2003 | Kay | 266/46 |
| 2005/0236401 A1 * | 10/2005 | Davids et al. | 219/635 |

FOREIGN PATENT DOCUMENTS

| | | |
|---|---|---|
| GB | 780313 A | 7/1957 |
| JP | 53-117610 A | 10/1978 |
| JP | 59-140331 A | 8/1984 |
| JP | 2003-013135 A | 1/2003 |

* cited by examiner

*Primary Examiner* — Milton I Cano
*Assistant Examiner* — Sarah A Slifka
(74) *Attorney, Agent, or Firm* — Philip O. Post

(57) ABSTRACT

A spray quench system is provided with one or more spray quench rings that eject a controlled volume of spray onto a workpiece passing through the quench rings. The quench rings can be adjusted in position independently of each other relative to the workpiece being sprayed. Reflected spray guards may be provided to prevent spray interference between adjacent quench rings. The outlets of the quench rings may be adjustable in volume. A controller can be provided to optimize the distribution of quench cooling flows from the quench rings. Sets of quench rings with different diameters in each set may be provided in modular form.

12 Claims, 6 Drawing Sheets

US 8,501,083 B2

SPRAY QUENCH SYSTEMS FOR HEAT TREATED METAL PRODUCTS

CROSS REFERENCE TO RELATED APPLICATIONS

This application claims the benefit of U.S. Provisional Application No. 60/771,386, filed Feb. 8, 2006, hereby incorporated by reference in its entirety.

FIELD OF THE INVENTION

The present invention relates to spray quench systems used in heat treatment processes of metal products.

BACKGROUND OF THE INVENTION

Quench, or quench and temper, metallurgical processes are widely used to harden, or harden and temper, a manufactured metal product such as steel pipe, to achieve desired metallurgical properties different from those for the starting material used to produce the metal product. Quenching is done after heating of the product, for example, by electric induction heating. Open spray quenching systems are one type of quench systems that can be used to accomplish the hardening and tempering of the metal product. When in-line quenching long, round products, such as pipes, bars or tubing, at production line speed, an important parameter that determines the material properties achieved by these processes is the metal cooling rate, which must generally be as fast as is possible to obtain the desired results. The cooling rate, in turn, is determined by the volume of quenchant used during the rapid cooling of a heated metal part. The traditional apparatus used to provide a high volume flow of water to the surface of a heated part is sometimes known as a quench barrel. The typical quench barrel is a large diameter, monolithic cylinder equipped with a multitude of holes through which quench media flows under medium pressure. Upon contact with the heated metal part, the quenchant provides the rapid cooling necessary to obtain a desired hardness. Also well known is the fixed position quench ring or slot quench. This apparatus is a hollow ring through which the part to be quenched passes. The apparatus contains a multitude of equally spaced holes or slots that act as nozzles for the quenching fluid. The slot quench is typically used in single part, small volume applications, such as induction hardening scanners.

Quenching systems must be capable of treating a range of product diameters. However, existing quench barrels and quench rings have a fixed inside diameter. When products having different diameters pass through these fixed diameter devices, the shape of the spray impinging on the product, the spray flow rate, and spray pressure change due to the difference in gap between the spray nozzles and the product. For existing quench systems when the spray is reflected from the product for a given nozzle, the reflected spray can interfere with the spray pattern of adjacent nozzles, and diminish or even destroy their effectiveness. The above limitations of existing quench systems can also cause expanding steam to form at the surface of the product to be quenched. This creates a thermal steam barrier that greatly reduces the rate of cooling of the product.

Further the small "pin hole" quench nozzles used to create the water jets in existing barrel quench systems limit the effective spray volumes and pressures that can be achieved.

Additionally since the product typically must move through the quench device both linearly and while rotating, the supporting conveyor rolls are skewed relative to the axis of travel of the product. This causes different diameter product to run on different centerlines through the conventional fixed geometry quench systems.

It is an object of the present invention to overcome the above limitations of existing spray quench systems.

BRIEF SUMMARY OF THE INVENTION

In one aspect the present invention is an apparatus for and method of spray quenching a metal product. At least one quench ring comprises a quenchant plenum and outlet for ejecting quenchant onto the metal product. The quench ring may be formed from two interconnecting ring elements. The interconnected ring elements form the quenchant plenum and outlet for ejecting quenchant onto the metal product. Adjusting the relative positions of the two interconnecting ring elements changes the shape and volume of the outlet to change the pressure, flow rate and/or pattern of the spray from the outlet.

In other aspects the present invention comprises an apparatus for and method of spray quenching a metal product with a plurality of quench rings, wherein each of the quench rings comprises a quenchant plenum and outlet for ejecting quenchant onto the metal product. Each quench ring may be formed from two interconnecting ring elements. The interconnected ring elements form the quenchant plenum and outlet for ejecting quenchant onto the metal product. Adjusting the relative positions of the two interconnecting ring elements changes the shape and volume of the outlet to change the pressure, flow rate and/or pattern of the spray from the outlet. A spray guard may be associated with one or more of the quench rings to prevent interference of the quenchant spray from a quench ring by the reflected spray from an adjacent quench ring.

The above and other aspects of the invention are further set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

In all examples of the invention, workpiece 90 (metal product) being heat-treated moves linearly through one or more quench rings along the Z-axis and in the direction of the arrow shown in the figures. In some examples of the invention, the workpiece may also rotate about the Z-axis as it moves through the one or more quench rings. Suitable mechanical means, not shown in the figures, such as support rollers are used to advance the workpiece through the quench rings. Although workpiece 90 is illustrated as a cylindrical pipe or conduit, the invention may be used with workpieces of different shapes such as, but not limited to, a rectangular tube. Also the workpiece may comprise a series of discrete workpieces, such as gears, suitably mounted on a conveyance means for moving the discrete workpieces through the one or more quench rings. Heating apparatus for heating the workpiece prior to quenching is not shown in the figures, but may be, by way of example and not limitation, one or more solenoidal electric induction coils surrounding the workpiece for inductively heating the workpiece when an ac current flows through the one or more coils. Also in some configurations, heating apparatus may be interspaced between two or more of the quench rings.

Figure 1:
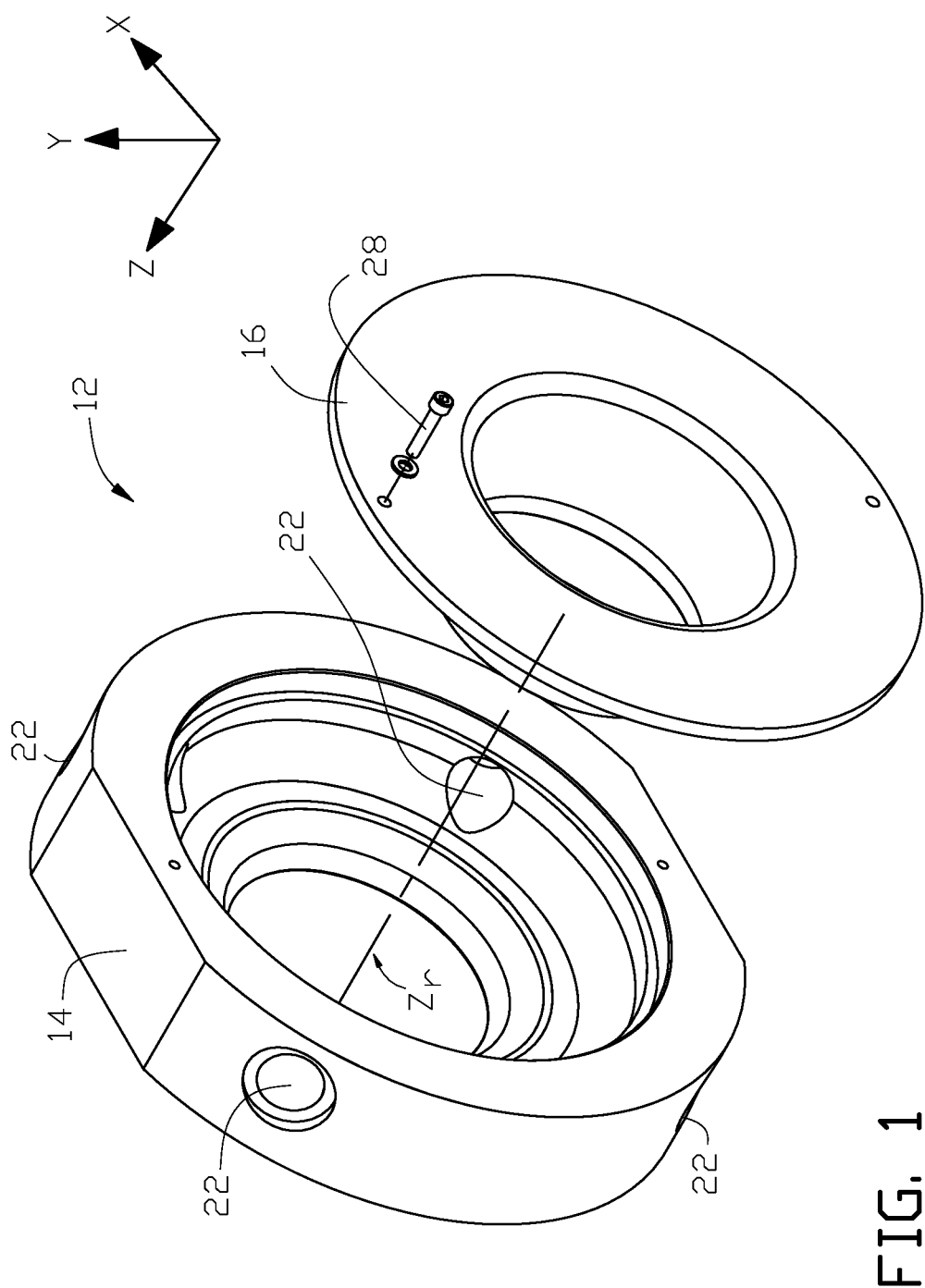
FIG. 1 is a perspective view of one example of a quench ring used in the spray quench system of the present invention.
Figure 3:
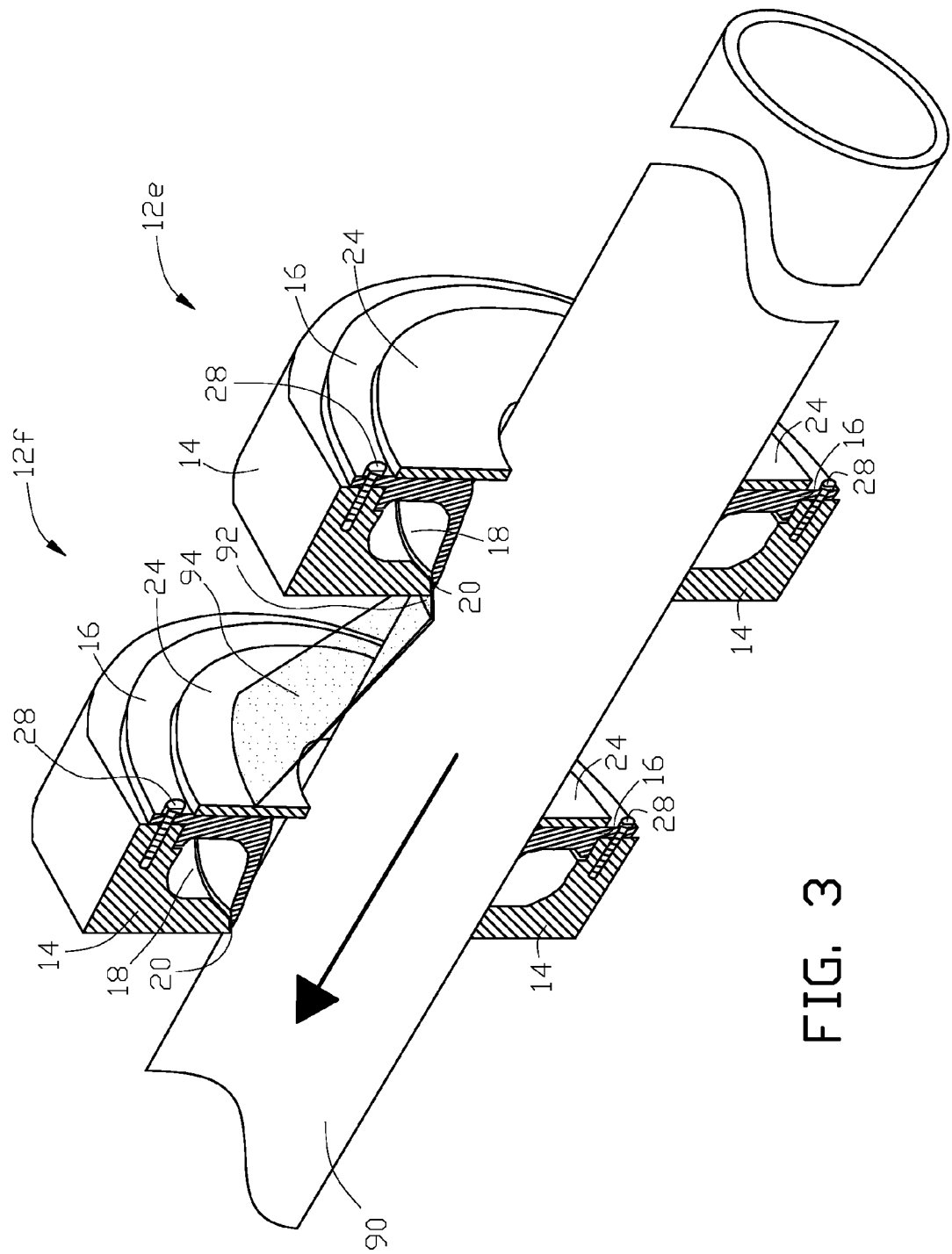
FIG. 3 is a sectional view of one example of two quench rings of the spray quench system of the present invention.
Figure 4:
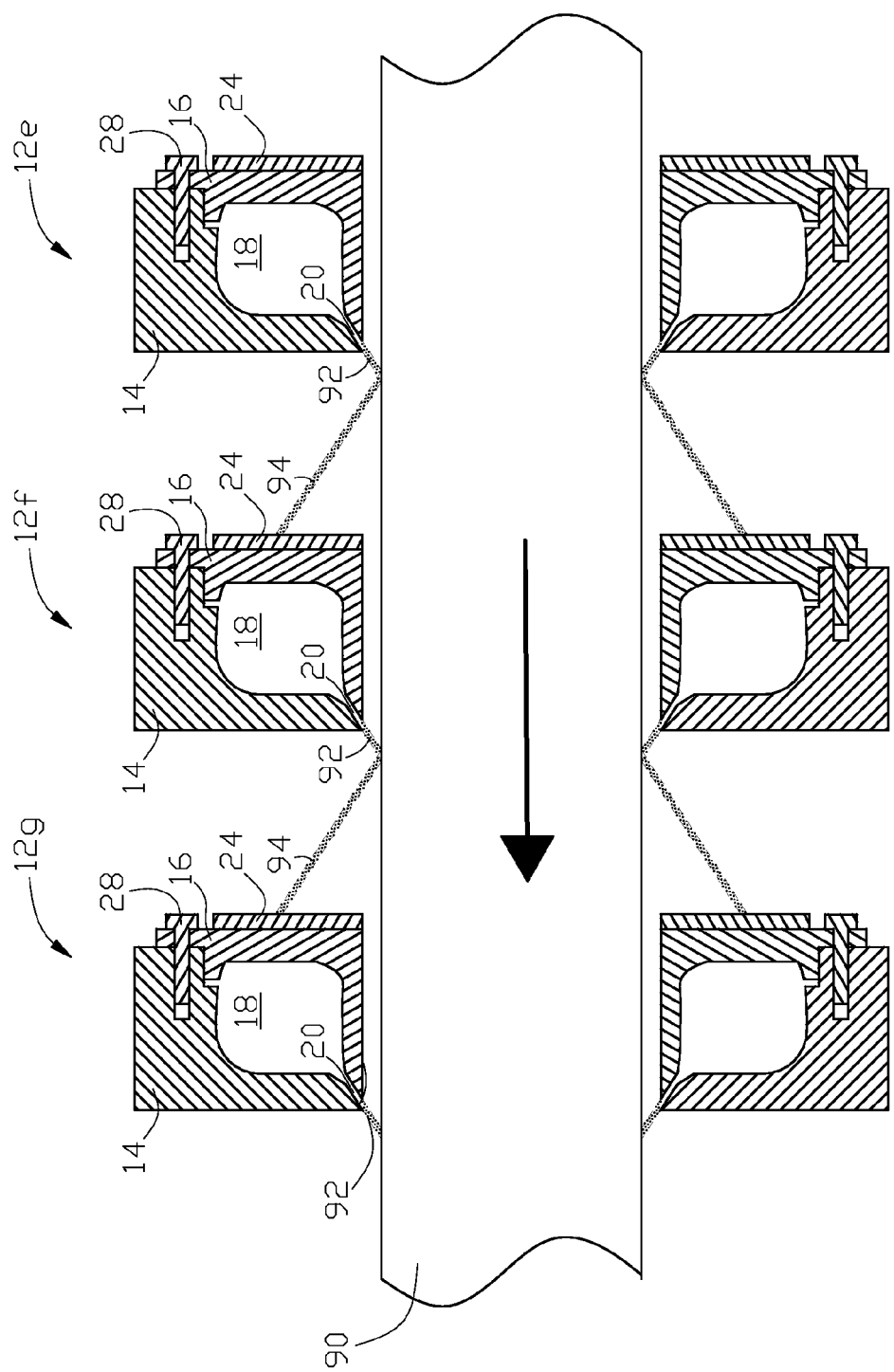
FIG. 4 is a sectional view of one example of three quench rings of the spray quench system of the present invention.
Figure 5:
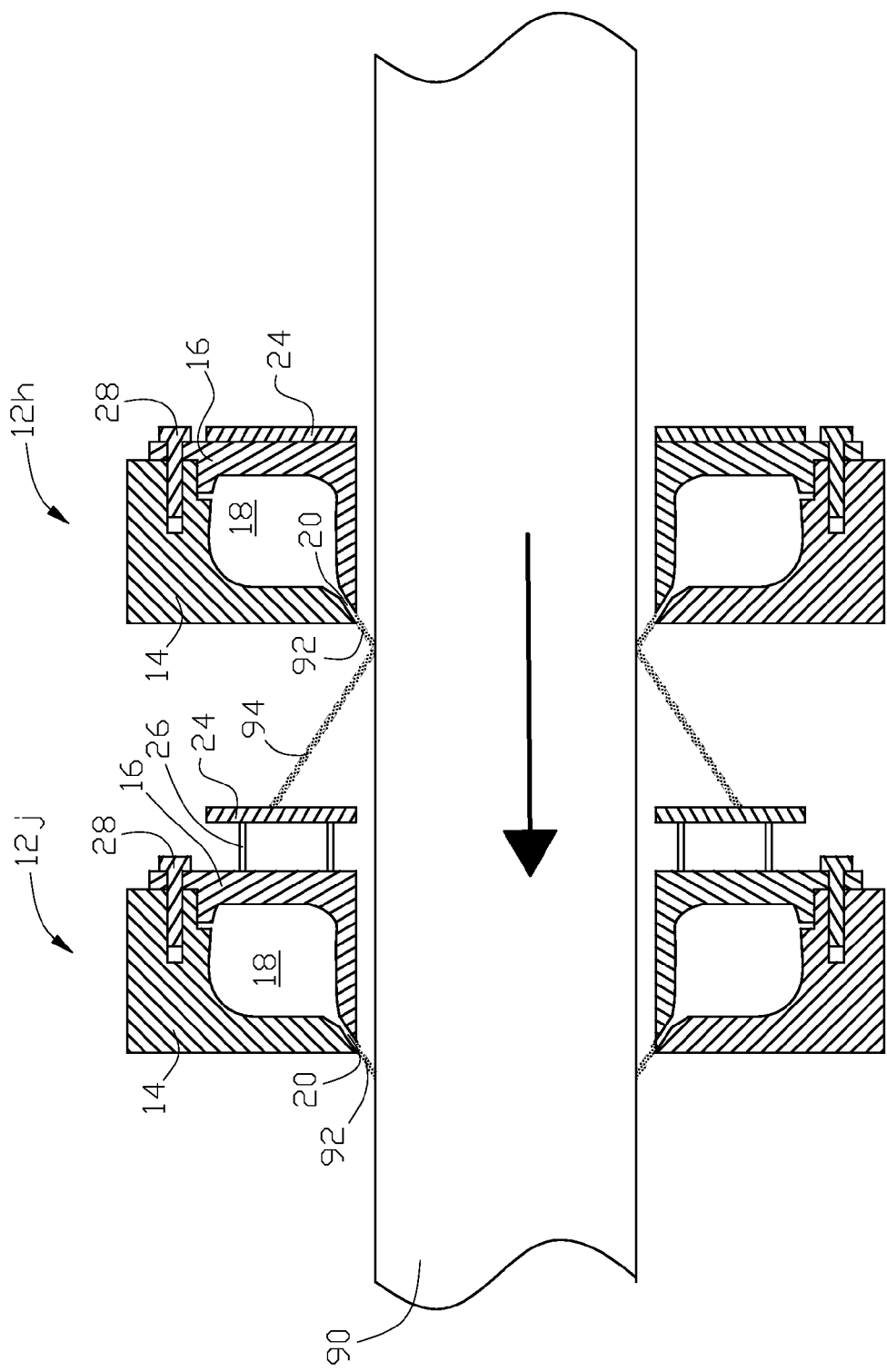
FIG. 5 is a sectional view of one example of two quench rings of the spray quench system of the present invention with one quench ring having an extended spray guard.

Referring to FIG. 1, there is shown one example of a quench ring 12 used in the spray quench system of the present invention. In this example the quench ring comprises interconnecting first ring element 14 and second ring element 16. In this non-limiting example, second ring element 16 is adjustably inserted into first ring element 14 as best seen in FIG. 3, FIG. 4 or FIG. 5, to form quench ring plenum 18 and outlet passage 20. Moving the first and/or second ring elements along the defined central axis, $Z_r$, (FIG. 1), increases or decreases the size of outlet passage 20 of the quench ring to change the pressure, flow rate and/or pattern of the spray from the outlet passage. In this non-limiting example of the invention, one or more fasteners 28 are used to control the spacing between the first and second ring elements so that the shape and volume of the outlet opening will correspondingly change as the spacing is changed. Quenchant is supplied to the quench ring plenum by one or more inlet passages 22 from a suitable source. In this non-limiting example of the invention, outlet passage 20 is an annular opening, generally conical in shape, and ejects quenchant 360 degrees around workpiece 90 in a generally conical volume as illustrated by typical flow volume 92 (partially shown as a shaded section) in FIG. 3, FIG. 4 or FIG. 5. While the present example uses a 360 conical flow pattern, other examples of the invention may use different flow patterns as determined by the particular configurations of first and second ring elements. For example one alternative may be annularly segmented conical flow sections around the workpiece where segmented sections are separated by a barrier to produce quenchant flow in selected one or more regions around the workpiece. For example rather than 360 degrees quenchant flow as described above, quenchant flow may be restricted to angular regions defined as 0 to 90 degrees and 180 to 270 degrees around the workpiece by the separation barriers. In some examples of the invention the shape and volume of the outlet of the quench ring may be fixed.

Figure 2:
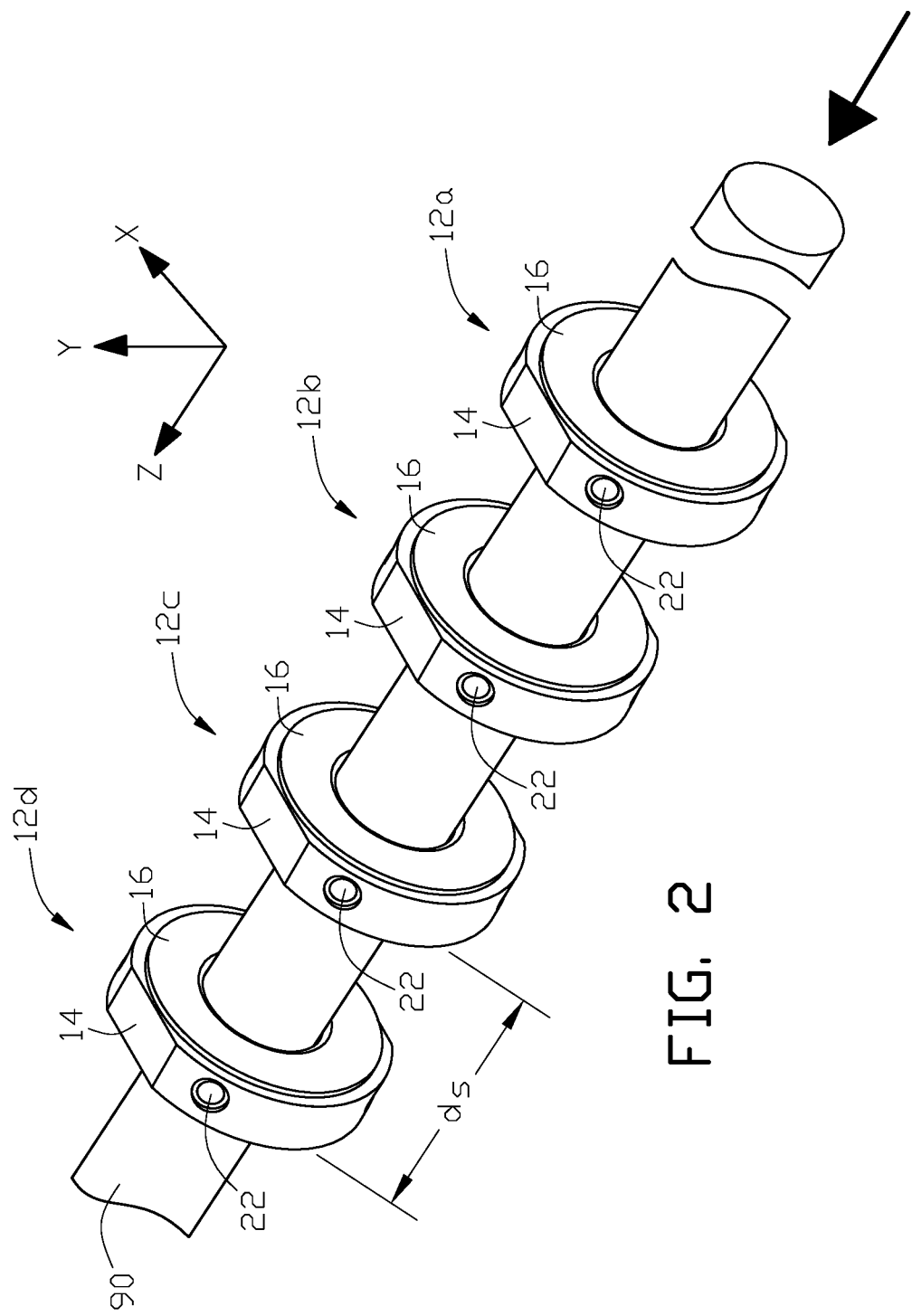
FIG. 2 is a perspective view of one example of a plurality of quench rings used in the spray quench system of the present invention.
Figure 6:
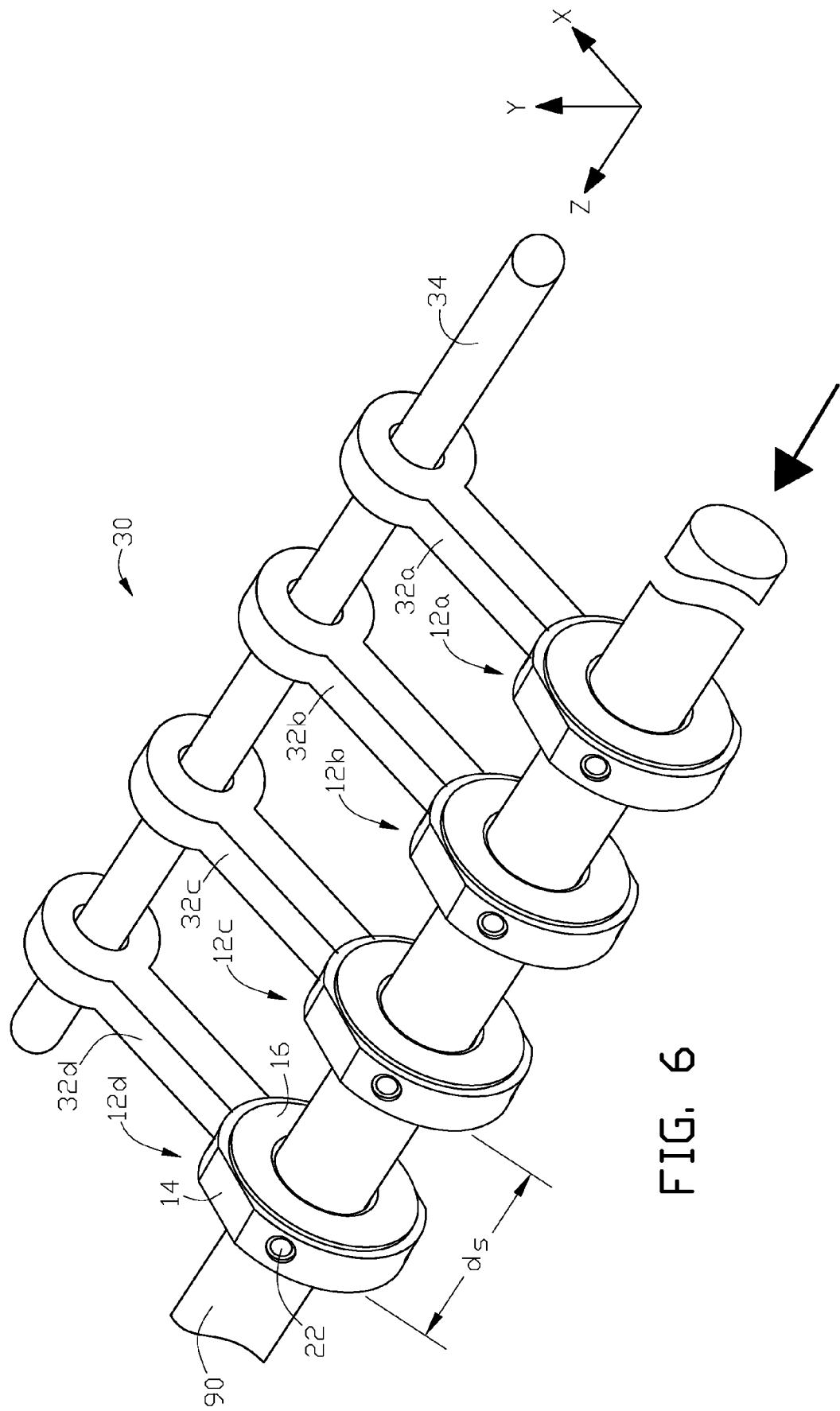
FIG. 6 is a perspective view of one example of a plurality of quench rings in the spray quench system of the present invention wherein the plurality of quench rings are attached to a support structure.

FIG. 2 illustrates another example of the spray quench system of the present invention. In this example, a plurality of quench rings 12*a*, 12*b*, 12*c* and 12*d*, surround workpiece 90 as it moves through the quench rings. Each quench ring is similar in construction to the quench ring shown in FIG. 1. The distance, $d_s$, between adjacent quench rings can be independently adjusted by suitable mounting structure to satisfy the quench conditions of a particular application. Further the location of the central axis, $Z_r$, of each quench ring may be independently adjusted by suitable mounting structure to satisfy the quench conditions of a particular application. As noted above, in some applications the workpiece rotates about the Z-axis while moving through the one or more quench rings. In this arrangement torque forces may cause the position of the central axis of the workpiece to deviate as it passes through the quench rings. Moving a quench ring so that its central axis tracks this deviation of the position of a workpiece moving through it may be beneficial. FIG. 6 diagrammatically illustrates one non-limiting example of a suitable mounting support structure 30. Support structure 30 comprises support arms 32*a*-32*d* and quench ring position control element 34. Support arms 32*a*-32*d* connect quench rings 12*a*-12*d*, respectively, to quench ring position control element 34. The position of each support arm can be adjusted along the Z-axis by control element 34 to change the distance between two or more adjacent quench rings. In some examples of the invention the location of the central axis of one or more of the quench rings can be changed in the X-Y plane by moving the support arm associated with the one or more quench rings in the X-Y plan by control element 34. Control element 34 and the support arms can be driven by suitable actuators that are responsive to the output of a computer process controller to rapidly perform the desired changes in positions of the one or more quench rings.

FIG. 3 illustrates another example of the spray quench system of the present invention. Quench rings 12*e* and 12*f* are similar in construction to the quench ring shown in FIG. 1, and also include spray guard 24, which is attached to the upstream side of the quench rings to deflect and dissipate reflected spray volume 94 (partially shown as a shaded segment in the figures). One non-limiting example of a spray guard is in the shape of an annular disk. Spray volume 94 represents a typical envelope for spray reflected off of the workpiece from incident spray in volume 92. Deflecting and dissipating the reflected spray volume before quenchant release from an upstream quench ring prevents interference of the reflected spray with the released quenchant from the upstream quench ring. For example in FIG. 4 reflected quenchant released from quench ring 12*e* is deflected by spray guard 24 associated with upstream quench ring 12*f*, and reflected quenchant from quench ring 12*f* is deflected by spray guard 24 associated with upstream quench ring 12*g*. Spray guard 24 may be permanently affixed to a side of its associated quench ring, or adjustably attached to its associated quench ring as shown in FIG. 5, wherein one or more offset fasteners 26 are used to offset spray guard 24 from associated quench ring 12*j*. This arrangement is of advantage in applications where the downstream quench ring is located further downstream than suitable for mounting a spray guard directly on the side of the quench ring. The shape and positioning of each spray guard can change depending upon a particular arrangement of quench rings and the workpiece being heat-treated.

In another example of the invention, in combination with one or more of the above examples of the invention, individual quench ring flows can be adjusted to optimize the distribution of the cooling flows from each quench ring to match the quench rate to the mass cooling requirement of the workpiece. For example a computer processor with suitable input and output devices may be used to accomplish one or more of the following quench system adjustments: (1) change of distance between two or more quench rings; (2) change of centerline position of one or more quench rings; (3) change in position of one or more spray guards and (4) change in outlet shape and volume of one or more quench rings, including complete closure of the outlet for one or more quench rings. These quench system adjustments may be dynamically accomplished by a computer program executed by the processor based upon the mass cooling requirements of the workpiece passing through the quench rings. In some examples of the invention heat imaging of the workpiece, for example infrared imaging, may be used to provide feedback data to the control system to indicate real time cooling results.

In another example of the invention, one or more quench rings of a particular inside diameter can be assembled in a module. The module can incorporate the support structure describe above. Different modules having quench rings of different inside diameters, and/or other different quench system features, may be interchanged on a heat treatment line to accommodate workpieces of different dimensions and/or workpieces having different mass cooling requirements. Quick connections for quenchant and any electrical and/or mechanical interfaces may be provided with each module.

The particular shape of the first and second quench ring elements shown in the examples of the invention may be changed without deviating from the scope of the invention as long as the elements form a quenchant plenum chamber and adjustable outlet opening or openings. Further more than two ring elements (first and second quench ring elements) may perform the same functions of the described invention without deviating from the scope of the invention. In some examples of the invention the one or more quench rings may be formed as a split ring assembly, with optional hinge elements, so that the one or more quench rings may be interchanged around a workpiece.

While a certain number of quench rings are shown in the various examples of the invention, the number of quench rings may be changed without deviating from the scope of the invention. Further one or more quench rings may be interspaced with other components in a particular application, such as mechanical supports or transport components for the workpiece, and heating components, such as induction heating devices. In arrangements with two or more quench rings, the outlet volume of each quench ring may be independently adjusted to form a unique spray volume as required for a particular application.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification and the appended claims, may effect numerous modifications thereto, and changes may be made without departing from the scope of the invention in its aspects.

The invention claimed is:

1. A quench ring for ejecting quenchant onto a workpiece passing through the quench ring, the quench ring comprising:
   an outer ring element having at least one exterior opening for connection to a supply of quenchant to an interior region of the outer ring element;
   an inner ring element at least partially inserted into the outer ring element;
   a quench ring plenum formed from the interior region of the outer ring element in combination with an interior region of the inner ring element for receiving the supply of quenchant from the at least one exterior opening; and
   an outlet passage from the quench ring plenum formed between an adjacent facing edges of the outer and inner ring elements for ejecting quenchant from the quench ring plenum in a direction to make contact with a surface region of the workpiece subsequent to passing through the quench ring.

2. The quench ring of claim 1 wherein the volume of the outlet passage is changed by one or more fasteners joining the inner and outer ring elements.

3. The quench ring of claim 1 wherein the outlet passage comprises an annular opening with the adjacent facing edges of the outer and inner ring elements having conically-shaped walls to establish a conical flow pattern of the quenchant ejecting from the quench ring plenum.

4. The quench ring of claim 3 wherein the annular opening is segmented into two or more sections.

5. The quench ring of claim 1 further comprising a support structure having means for changing the location of the central axis of the quench ring.

6. A quench ring assembly for ejecting quenchant onto a workpiece passing through the quench ring assembly comprising:
   two or more quench rings, each of the two or more quench rings comprising:
      an outer ring element having at least one exterior opening for connection to a supply of quenchant to an interior region of the outer ring element;
      an inner ring element at least partially inserted into the outer ring element;
      a quench ring plenum formed from the interior region of the outer ring element in combination with an interior region of the inner ring element for receiving the supply of quenchant from the at least one exterior opening; and
      an outlet passage from the quench ring plenum formed between an adjacent facing edges of the outer and inner ring elements for ejecting quenchant from the quench ring plenum in a direction to make contact with a surface region of the workpiece subsequent to passing through the quench ring; and
   a support structure for mounting the two or more quench rings.

7. The quench ring assembly of claim 6 wherein the support structure further comprises means for changing the distance between two or more of the two or more quench rings.

8. The quench ring assembly of claim 6 wherein the support structure further comprises means for changing the location of the central axis of at least one of the two or more quench rings.

9. The quench ring assembly of claim 6 wherein the quench ring assembly comprises a module containing the two or more quench rings, each of the two or more quench rings having identical inside diameters.

10. The quench ring assembly of claim 6 further comprising a spray guard associated with the exterior of either the inner or outer ring of at least one of the two or more quench rings, the spray guard positioned to prevent interference of a reflected spray from the workpiece with the quenchant ejected from the at least one of the two or more quench rings, the reflected spray supplied from the outlet passage of an adjacent one of the two or more quench rings.

11. The quench ring assembly of claim 10 wherein the spray guard is adjustably located from the exterior surface of either the inner or outer ring of the at least one of the two or more quench rings.

12. The quench ring assembly of claim 9 wherein the module further comprises the support structure for mounting the two or more quench rings, the support structure further comprising means for changing the distance between two or more of the two or more quench rings, and means for changing the location of the central axis of at least one of the two or more quench rings.

* * * * *